Patented Apr. 9, 1940

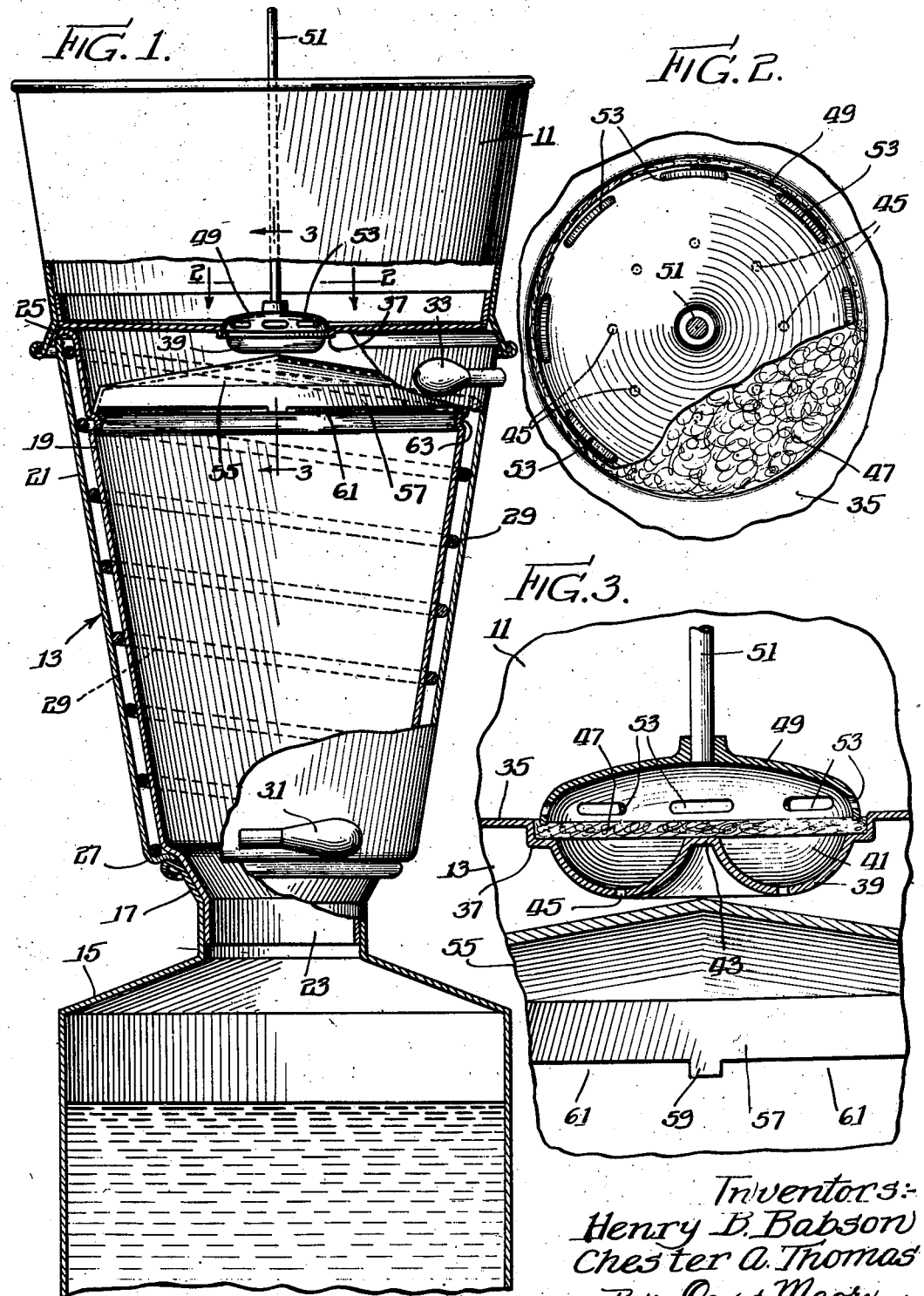

2,196,848

UNITED STATES PATENT OFFICE 2,196,848

MEANS FOR AND METHOD OF FILTERING

Henry B. Babson, Chicago, and Chester A. Thomas, Crystal Lake, Ill., assignors to Babson Bros., a limited partnership of Illinois Application March 25, 1937, Serial No. 133,030

3 Claims. (Cl. 210—159)

The invention relates in general to filtering and has more particular reference to improved means for and method of filtering milk.

An important object of the invention is to provide a simple and inexpensive device for filtering liquids embodying a filtering element including means for controlling the flow of liquid through the filtering element so as to prevent dirt and other foreign matter, removed from the liquid at and by the filtering element, from becoming impacted in the element and thus reducing the filtering efficiency thereof.

Another important object is to prevent clogging of a filtering element by controlling the flow of liquid through the element in such a way that the filtered liquid is released at the discharge side of the filtering element at a rate less than the maximum possible rate of flow of the liquid through the element under the influence of the pressure head causing liquid flow through the element.

Another important object is to provide for the application of a back pressure in the liquid discharged from a filter element in order to limit and check the flow of liquid through the element, thereby preventing the residue from becoming firmly impacted in the filtering element.

Another important object is to provide means forming a confining chamber on the discharge side of a filtering element, into which chamber the filtered liquid may be delivered from the filtering element, and from which the filtered liquid may be released at a regulated rate in order to maintain a back pressure on the filtering element.

Another important object is to provide a filter embodying a holder for a sheet-like filtering element, the holder providing a chamber on the discharge side of the filtering element and adapted to receive and confine filtered liquid, said chamber being formed to release the confined liquid at a regulated or metered rate of flow, less than that which would occur through the filtering element under the influence of the pressure head under which the liquid is delivered to the filtering element.

Another important object is to provide a simplified construction forming a milk filter and comprising a tub-like element, preferably of sheet metal, having an integral bottom formed with a continuous seat for receiving the peripheral edges of a sheet-like filtering element, said bottom inwardly of the seat being depressed to form a confining chamber upon the under or discharge side of a filtering disc in said seat; a further object being to form said bottom within said seat with at least one upstanding projection forming a support for the filtering element inwardly of the edges thereof; and a still further object of the invention is to provide a holder or clamp for securing the marginal edges of the filtering element in the continuous seat.

Another important object is to provide a filter of the character mentioned and including a confining chamber on the discharge side of a filtering element for use in combination with a milk cooler, wherein said confining chamber is formed with a plurality of preferably circularly arranged openings through which the filtered liquid may escape and be deposited upon the downwardly and outwardly sloping surfaces of a spreading plate for delivery thence to the downwardly and inwardly sloping refrigerated walls of a funnel-shaped cooler.

Numerous other important objects, advantages and inherent functions of the invention will become apparent as the same is more fully understood from the following description, which, taken in connection with the accompanying drawing, discloses a preferred embodiment of the invention.

Referring to the drawing:

Figure 1 is a side view, partially in section, of a milk strainer embodying the present invention, the strainer being shown in combination with a cooler of the character adapted to deliver chilled milk directly into a can; and Figures 2 and 3, respectively, are sectional views taken substantially along the lines 2—2 and 3—3 in Figure 1.

To illustrate the invention, we have shown on the drawing a filter 11 adapted for use in combination with a cooler 13 whereby to deliver liquid in filtered and chilled condition to a container 15.

The container 15, of course, may be of any suitable or preferred form, but for the sake of illustrating the invention the receiver 15 is shown as a conventional milk can having a conical opening or mouth 17 in its upper portions. The cooler 13 likewise may be of any desired convenient or suitable form, and as shown, may comprise hollow walls for the circulation of a refrigerating medium therein. The cooler may be formed by assembling a conical shell 19 within an outer conical shell 21, the shell 19 having a portion 23 at its end of lesser dimension forming a neck adapted to fit into the mouth 17 of the liquid receiver. At its opposite end the shell 19 may be formed with an outstanding curled flange 25 to which may be sealed the adjacent end edge of the outer shell 21. The opposite end of the shell 21 may be curled as at 27 and sealed upon the neck portion 23 of the inner shell. A helically arranged rod 29 may be disposed between the shells 19 and 21 to define a helical channel in the hollow walls of the cooler, and the outer shell 21 may be provided with suitable inlet and outlet nozzles 31 and 33, both opening into the helical channel so formed at the opposite ends thereof. By delivering a refrigerating medium, such as cold water, through the helical channel in the hollow walls of the cooler 13, the walls of the cooler may be refrigerated so as to absorb heat from any liquid contained within the cooler.

The filter 11 preferably comprises a tub or bowl-like container, preferably of sheet metal, with its lower side walls formed to fit upon or within the upper or larger end of the cooler. The bowl is formed with a bottom wall 35 having preferably a downwardly dished configuration. At the lowest point of said bottom wall 35, preferably centrally thereof, the wall is formed with a continuous groove or depression 37 forming a seat of preferably circular or annular shape. Inwardly of said seat 37 the bottom wall is depressed, as at 39, to form a chamber 41 below the seat 37. The portions of the wall 35 forming the chamber 41 may also be formed as at 43, preferably centrally of the seat 37, to provide a pedestal seat substantially in alinement with the seat 37, and the chamber forming portions 39 are also preferably formed with a plurality of circularly arranged openings 45 disposed around the pedestal 43, preferably in the lowermost portions of the chamber 41.

The seat 37 is adapted to receive and support the peripheral edges of a filter element 47, preferably a disc of fabric or other suitable filter material, the invention particularly contemplating a woven cotton filter disc when the device is used as a milk strainer. The element 47 may be supplied in sizes to fit the seat 37 and it is simply necessary to place the filter element with its edges in the seat 37 and its central portions supported on the pedestal 43. To hold the filter element in place, a holder or clamp 49 may be provided. In the illustrated embodiment the clamp 49 comprises a cup-shaped element, preferably formed as a casting, having a handle 51 suitably secured to the bottom of the cup for the purpose of manipulating the same without touching the parts of the holder which may become immersed in the liquid being filtered when the device is in operation. The element 49 is formed with openings 53 and has a rim conforming with the size and shape of the seat 37 so that by placing the handle with its edges resting upon the peripheral edges of the filter element in the seat 37, said filter element may be securely held in place.

The liquid to be filtered may then be delivered in the bowl or tub 11 in any suitable or preferred fashion and under any desired head pressure. For filtering milk, however, it is ordinarily sufficient to pour the liquid into the bowl 11 and rely upon the pressure of the head of milk in the bowl to force the liquid through the filter element 47. The liquid in the bowl 11 penetrates the openings 53 into the chamber within the holder 49, and passes thence through the filter element 47 and is received in filtered condition within the chamber 41. The openings 45 are of a size adapted to release the filtered liquid from the chamber 41 at a slower rate than the rate at which the liquid may flow through the filter element under the influence of the pressure head of liquid in the bowl 11, so that a back pressure on the filter element is created. Such a back pressure applied on the discharge side of the filter element prevents the liquid from being forced through the filter element at full head pressure, and prevents such solid material as is removed from the liquid by the filter element from being impacted upon and embedded in the filter layer, which is thus maintained relatively free of impacted solid residue removed from the liquid being filtered. The filter element is thus maintained in condition for efficient filtration and may be used for filtering larger quantities of liquid than would otherwise be possible in the absence of means for preventing the filter element from becoming clogged with the residue. The holder 49 may also aid in maintaining the filter element 47 free of impacted residue, since the construction and arrangement of the holder 49 will ordinarily prevent large solid elements from reaching the filter element.

The filter of the present invention is particularly well adapted for use in filtering milk in conjunction with a milk cooler of the character heretofore described, and to which the bowl 11 of the filter may removably fit, as shown in Figure 1. We prefer also to provide a liquid spreader 55 for use in the cooler 13 in conjunction with the filter. This spreader 55 may comprise a preferably sheet metal disc having portions sloping downwardly and outwardly of the central portions of the disc, the marginal edges of the disc being flanged as at 57 to fit within the cooler at an elevation therein such that the central portions of the spreader extend immediately below the bottom of the filter bowl when the same is in place in the cooler. The flange 57 is provided with projections 59 of any suitable or convenient form or construction, and arranged circularly at intervals in the edges of the spreader in position to engage and seat upon the inner walls of the cooler whereby to provide slot-like openings 61 between the outer edge of the spreader and the inner wall surface of the cooler. The apexial portion of the spreader 55 is thus disposed beneath the chamber forming portions 39 of the filter so that liquid discharged through the openings 45 of the filter may be deposited upon the upper surface of the spreader and may drain thence in radial directions and in a thin film over the surfaces of the spreader to the marginal edges thereof and be delivered substantially uniformly upon the inner refrigerated surfaces of the cooler and pass thence in the form of a uniform and thin film of liquid downwardly along said refrigerated walls while losing heat to said walls and the refrigerating medium circulating therein. The liquid after being cooled during its passage downwardly along the walls of the cooler is delivered to the container 15 in chilled and filtered condition. In order to support the spreader 55 in operative position in the cooler, the latter may be formed with an annular ridge 63 in the wall 19 forming a seat for receiving the rim of the spreader and supporting the same through engagement with the projections 59.

It is thought that the invention and its numerous attendant advantages will be fully understood from the foregoing description, and it is obvious that numerous changes may be made in the form, construction and arrangement of the several parts without departing from the spirit or scope of the invention or sacrificing its attendant advantages, the form herein disclosed being a preferred embodiment for the purpose of demonstrating the invention.

Having thus described our invention, what is claimed as new and is desired to be secured by Letters Patent of the United States is as follows:

1. A milk filter comprising a bowl having a filter element receiving seat formed therein and surrounding a depressed filtrate receiving chamber in the bowl, a cloth filter element peripherally received upon said seat above said receiving chamber, a pedestal centrally of said receiving chamber and having in its upper portion a pedestal seat centrally supporting said filter element, a cup shaped clamping holder arranged over the filter element and peripherally engaging the filter element and maintaining the filter element against the seat and having inlet openings, outlet openings in said filtrate receiving chamber, said outlet openings being so proportioned that their resistance to the flow of the milk from the chamber is greater than the flow resistance of the filter element and the inlet openings whereby a back pressure is created against the filter element, said filter element at intermediate points between said pedestal seat and said peripheral seat being substantially unsupported and being adapted to be held from excessive downward distortion by said back pressure.

2. For use in combination with a milk cooler, a filter comprising a milk receiving bowl provided with a filter element receiving seat surrounding a depressed filtrate receiving chamber in said bowl, a yieldable filter element peripherally received upon said seat above said receiving chamber, and having a pedestal seat centrally supporting said filter element, a cup shaped member substantially embracing peripherally the upper side of the filter element and having inlet openings communicating with said upper side of the filter element, outlet openings in said filtrate receiving chamber, said outlet openings being so proportioned that their resistance to the flow of the milk from the chamber is greater than the flow resistance of the filter element and the inlet openings whereby a back pressure is created against the filter element, said filter element at intermediate points between said pedestal seat and said peripheral seat being substantially unsupported and being adapted to be held from excessive downward distortion by said back pressure, and a spreader baffle plate beneath the chamber for distributing filtrate uniformly to the interior wall of said cooler, said plate having a central apexial portion with its outer portions formed to slope downwardly therefrom, and said outlet openings being annularly disposed about the vertical axis of said apexial portion, whereby the filtrate is distributed symmetrically about said sloping sides.

3. A milk filter comprising a bowl having a filter element receiving seat formed therein and surrounding a depressed filtrate receiving chamber in the bowl, a yieldable filter element peripherally received upon said seat above said receiving chamber, a supporting means centrally of said receiving chamber and having its upper portion centrally supporting said filter element, a clamping holder having a wall operatively disposed to protect the filter element from direct impact of the incoming milk, and peripherally engaging the filter element and maintaining the filter element against the seat and having inlet opening means, outlet opening means in said filtrate receiving chamber, said outlet opening means being so proportioned that its resistance to the flow of the milk from the chamber is greater than the flow resistance of the filter element and the inlet openings whereby a back pressure is created against the filter element, said filter element at intermediate points between said supporting portion and said peripheral seat being substantially unsupported and being adapted to be held from excessive downward distortion by said back pressure.

HENRY B. BABSON.
CHESTER A. THOMAS.